United States Patent [19]

Ouhayoun

[11] Patent Number: 5,035,506
[45] Date of Patent: Jul. 30, 1991

[54] COHERENT DETECTION WITH INCREASED SENSITIVITY USING FOUR-WAVE AMPLIFICATION

[75] Inventor: Michel M. Ouhayoun, Paris, France

[73] Assignee: SAT (Societe Anonyme de Telecommunications), France

[21] Appl. No.: 434,910

[22] Filed: Nov. 9, 1989

[30] Foreign Application Priority Data

Nov. 9, 1988 [FR] France .................. 88 14611

[51] Int. Cl.⁵ .............................. G01B 9/02
[52] U.S. Cl. ...................... 356/349; 356/4.5; 356/5; 356/345
[58] Field of Search ............. 356/345, 349, 350, 4, 356/4.5, 28, 28.5, 5

[56] References Cited

U.S. PATENT DOCUMENTS 3,834,816 9/1974 Pedinoff .

4,515,471 5/1985 Eden .

FOREIGN PATENT DOCUMENTS 0040114 11/1981 European Pat. Off. .
0040116 11/1981 European Pat. Off. .
2561377 3/1984 France .

Primary Examiner—Samuel Turner
Attorney, Agent, or Firm—Rosenman & Colin

[57] ABSTRACT

A coherent optical detector has increased sensitivity for detecting a coherent optical signal by applying the coherent optical signal to be detected to a solid non linear medium pumped by two optical signals of opposite directions and coming from an auxiliary laser. The signal to be detected gives rise to an amplified signal applied with an auxiliary optical signal from the auxiliary laser, to a detector for causing these two optical signals to beat and detecting the beat and so the signal to be detected.

11 Claims, 2 Drawing Sheets

COHERENT DETECTION WITH INCREASED SENSITIVITY USING FOUR-WAVE AMPLIFICATION

BACKGROUND OF THE INVENTION

1. Field of the Invention

The present invention relates to a device for detecting a coherent optical signal comprising means for generating an auxiliary optical signal, also coherent, and means for causing the optical signal to be detected and the auxiliary optical signal to beat and for detecting the beat and so the signal to be detected.

Such a device is used, for example, in laser telemeter systems or else in active imagery systems. In these systems, the optical signal to be detected comes from the reflection from an object, or target, of an optical signal emitted by an emitter laser. For example, in the case of telemetry, the optical signal emitted is pulsed and measurement of the time interval which separates the time of emission from the time of detection of the reflected signal makes it possible to determine the distance at which the target is situated.

The auxiliary optical signal has a frequency slightly offset with respect to the frequency of the optical signal emitted by the emitter laser, for example of the order of a few tens of MHz. It is generated by a laser which therefore plays the role of local oscillator and its amplitude and frequency characteristics are invariable in time. The optical signal to be detected and the local optical signal are applied, for example, to a quadratic detector which causes these two signals to beat. This detector is followed by a filtering circuit centred on the beat frequency, so as to permit detection of the beat and so the signal to be detected. Such detection is called coherent optical detection.

In such a device, the maximum distance at which a detectable target may be located is obviously related to the value of the weakest signal capable of being detected. In fact, as is known, the further the target is away the weaker the signal received from reflection from the target of the emitted signal. In practice, the lower limit of the detectable signal is related to the signal to noise ratio of the local oscillator laser. Therefore, to increase the maximum value of the measurable distance, an optical amplifier may be used for amplifying the signal to be detected before beating.

However, conventional optical amplifiers themselves have a signal to noise ratio such that the increase of the performances of the assembly is little significant.

2. Description of the Prior Art

However, from the article by NAKAJIMA et al. "Intracavity nearly degenerate four-wave mixing in a (GaAl) As semiconductor laser", Appl. Phys. Lett. 47(8), 15 Oct. 1985, a device is known for amplifying in particular an optical signal without appreciably degrading the signal to noise ratio. This device uses a mixing of four optical signals, which mixing is of the type usually designated by "four-wave mixing", and which takes place here in a laser diode oscillating at the frequency $f_1$. This device provides not only, as is known, a change of sign of the phase of the optical signal which is applied thereto but also amplification of this signal. This amplifier device is however not applicable in the coherent detection device of which it is a question here, to the extent that when the signal to be amplified is at frequency $f$, the amplified signal is at frequency $f_a$, with:

$$f_a = 2f_1 - f$$

The frequency $f_a$ of the amplified signal is therefore equal to the frequency $f$ of the signal to be amplified only if the latter is strictly equal to the oscillation frequency $f_1$ of the laser diode of the amplifier device. Now, such a condition cannot be permanently obtained in the coherent detection device of which it is a question here, considering the independent variations which the two frequencies in question are likely to undergo.

Thus, the sensitivity of known coherent optical detection devices is therefore limited.

SUMMARY OF THE INVENTION

The object of the invention is to overcome, at least partially, the above drawbacks by providing a coherent detection device of the above defined type whose sensitivity is appreciably higher than in prior art devices.

For this, it provides a device of the above defined type, comprising a solid non linear medium, pumped by two optical signals having opposite directions and coming from the auxiliary optical signal, and which receives the optical signal to be detected for amplifying it before beating.

In the device of the invention, "four-wave mixing" takes place in the solid non linear medium and it results in phase combination and amplification of the signal to be detected which is not noisy, as in the device described in the article by NAKAJIMA et al. However, because the mixing does not take place in a laser diode oscillating at its own natural frequency $f_1$, but in the solid non linear medium pumped at frequency $f_{ol}$ of the local optical signal, the frequency $f_a$ of the amplified signal is now equal to:

$$f_a = 2f_{ol} - f$$

The result is that, when the amplified signal of frequency $f_a$ is caused to beat with the local signal of frequency $f_{ol}$, a beat is obtained at frequency $f_b$ equal to the difference between these two frequencies $f_a$ and $f_{ol}$, namely:

$$f_b = 2f_{ol} - f - f_{ol}$$

that is:

$$f_b = f_{ol} - f$$

and which is therefore the same beat frequency as in the absence of the amplifying medium, which means that nothing is changed in the beat detection chain.

In a first embodiment, the index of said solid medium is non linear with respect to the amplitude of the optical signal which it receives.

In a second embodiment, the coefficient of power amplification of said solid medium is non linear with respect to the amplitude of the optical signal which it receives.

BRIEF DESCRIPTION OF THE DRAWINGS

The present invention will be better understood from the following description of several embodiments of the device of the invention, with reference to the accompanying drawings in which.

DESCRIPTION OF THE PREFERRED EMBODIMENTS

Figure 1:
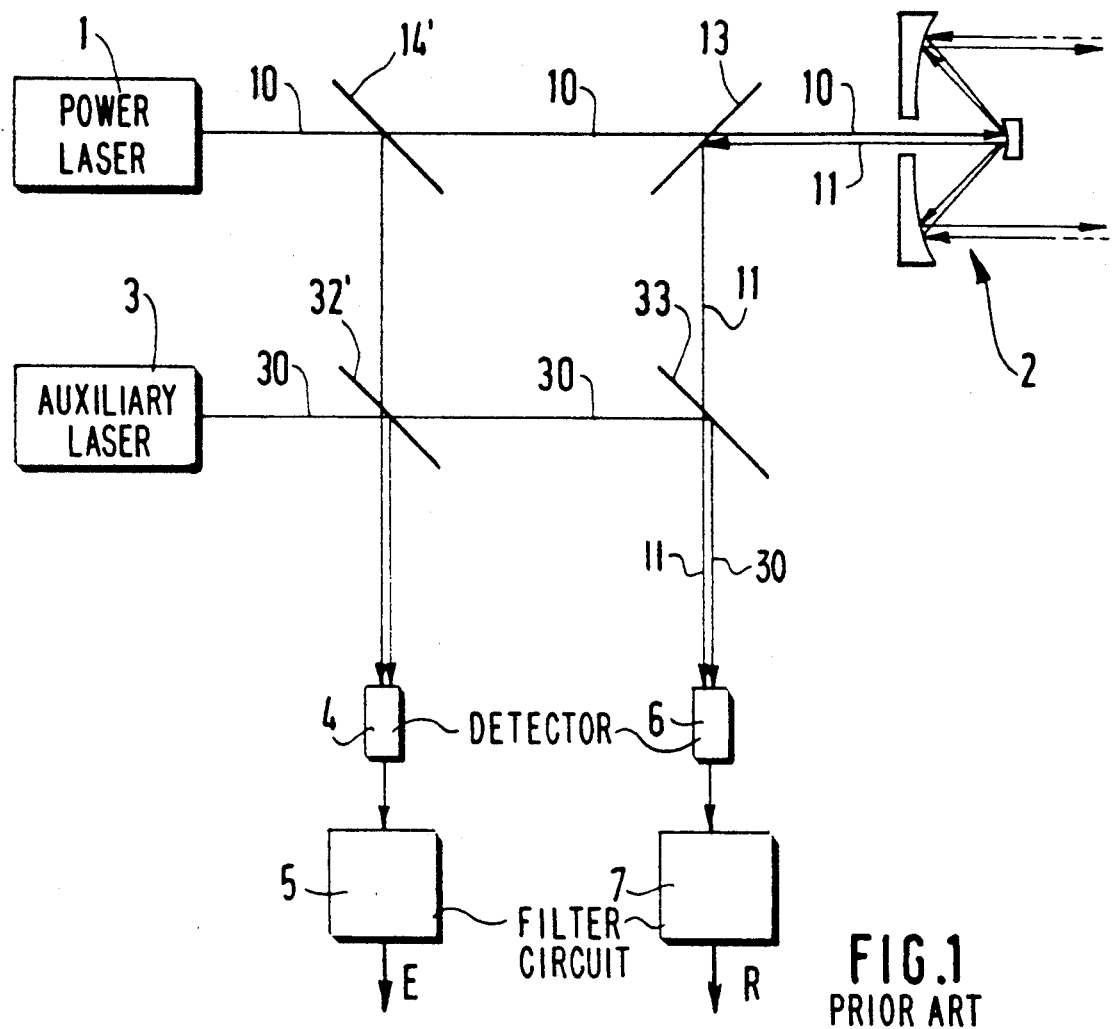
FIG. 1 shows schematically a telemetry system of the prior art.

Referring to FIG. 1, a telemetry system of known type comprises a power laser 1, here a $CO_2$ laser whose beam is directed towards an optical system 2 aimed at a target not shown whose distance is to be determined.

The light energy from the beam of laser 1 is reflected from the target and the reflected energy follows the same path in the reverse direction. To determine the distance of the target, and as is known, laser 1 is controlled so as to emit a coherent optical signal 10 of pulsed form. The reflected signal 11 is then also of pulsed form and measurement of the time interval which elapses between the emission time and the time of detection of the reflected optical signal makes it possible to determine the distance of the target.

In order to determine the emission time, a semi-reflecting mirror 14' is disposed in the path of the optical signal 10 so as to take off a portion and direct it towards a quadratic detector 4. Another semi-reflecting mirror 32' is disposed in the path of another coherent optical signal 30, generated by an auxiliary laser 3, so as to take off a portion and also direct it towards the detector 4. Laser 3 plays the role of local oscillator. It is here a $CO_2$ laser, controlled so as to emit the optical signal 30 whose power is constant, but much smaller than that of laser 1 and whose frequency is slightly offset with respect to that of the latter. The frequency shift of laser 3 with respect to laser 1 is, for example, 30 MHz. The two optical signals applied to the quadratic detector 4 beat therein and the beat, here at 30 MHz, is filtered and then detected in an electronic circuit 5 which delivers a signal E representative of the emitted signal, and particularly here of the emission time.

A semi-reflecting mirror 13 is disposed in the path of signals 10 and 11, so as to let signal 10 pass and reflect signal 11 towards another quadratic detector 6. Another semi-reflecting mirror 33 lets signal 11 pass and reflects signal 30 towards detector 6. Detector 6 is here identical to detector 4 and it is followed by an electronic circuit 7 identical to circuit 5. Detector 6 and circuit 7 therefore cause the reflected optical signal 11 and the auxiliary or local optical signal 30 to beat and detect the beat therebetween. Signal R delivered by circuit 7 is therefore representative of the reflected signal 11 and, in particular here, of the time of detection of this signal 11.

As is known, the maximum distance of the target which may be determined using the known system, which has just been described, is related to the sensitivity of the reflected signal detection device, which sensitivity is limited in practice by the noise of the local oscillator laser 3.

The detection device of the invention which will now be described with reference to FIGS. 2 to 4 makes it possible, when it is applied to the preceding system, to amplify the optical signal 11 before beating, so as to increase the maximum measurable distance of the target.

Figure 4:
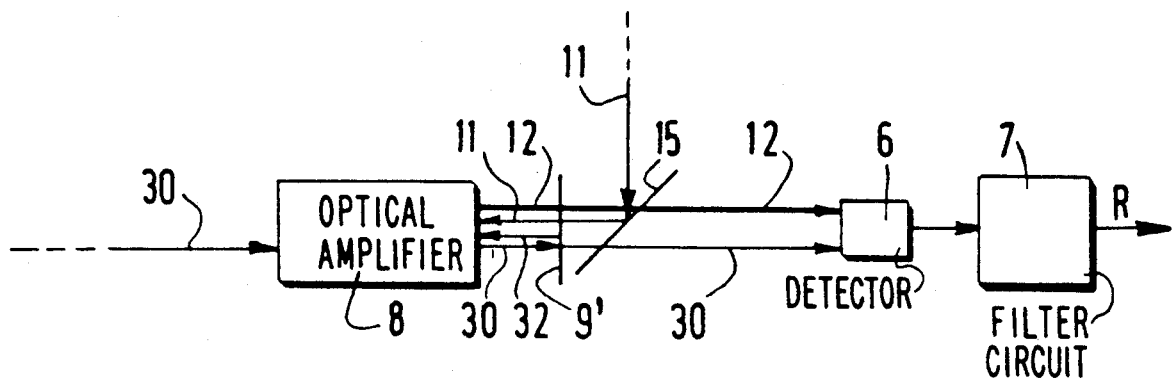
FIG. 4 shows a third embodiment of the detection device of the invention.
Figure 2:
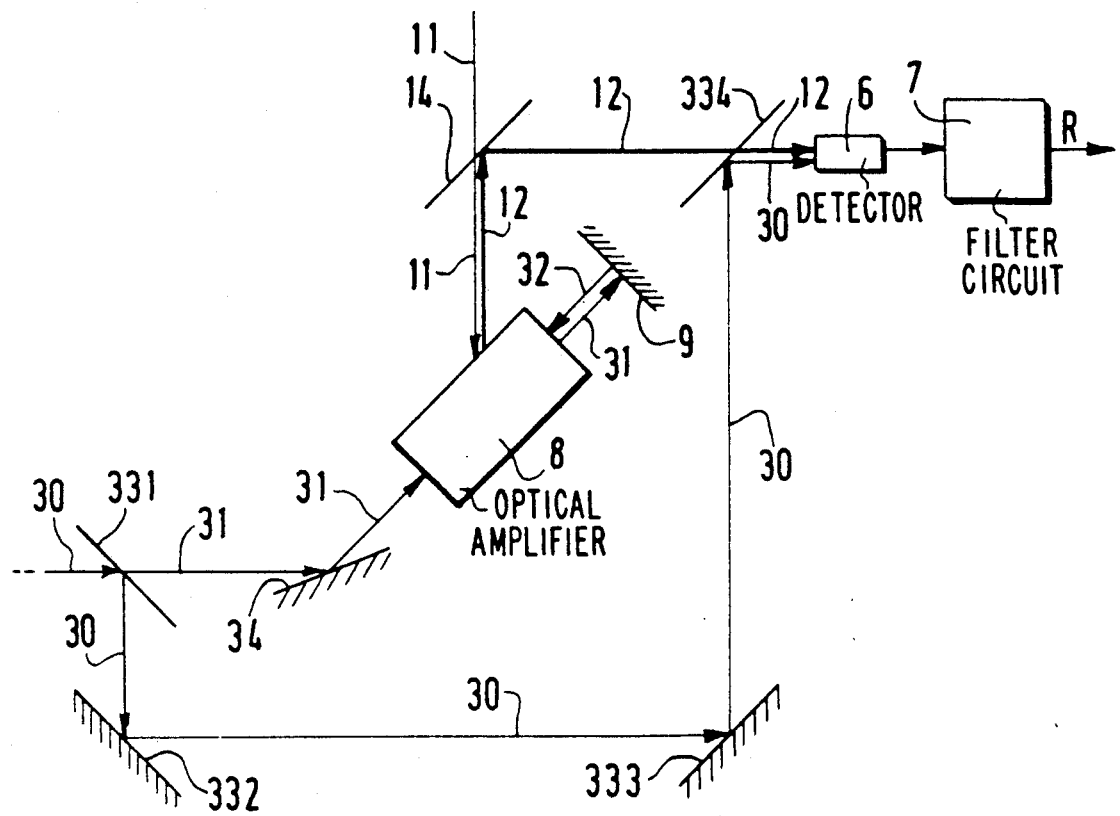
FIG. 2 shows a first embodiment of the detection device of the invention.
Figure 3:
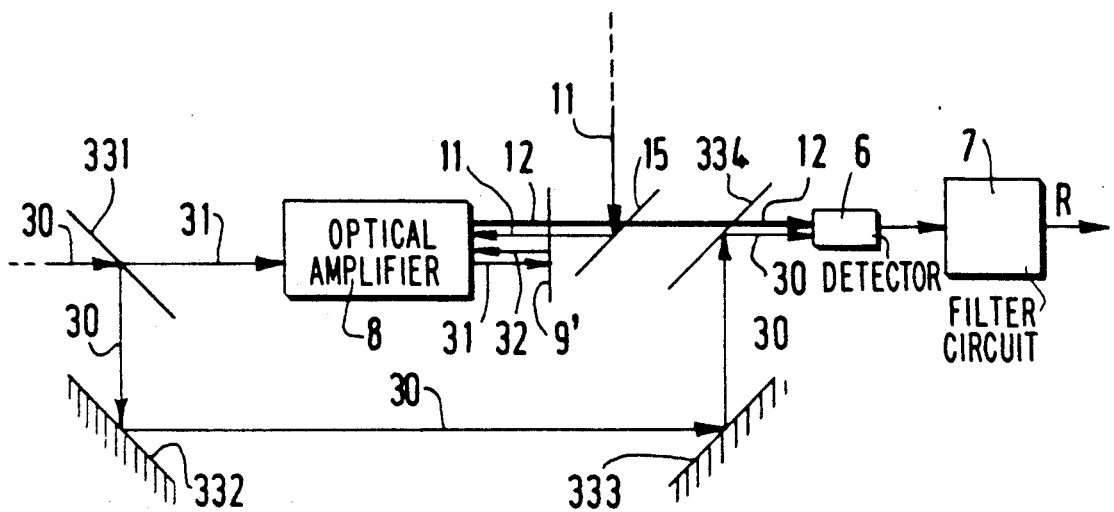
FIG. 3 shows a second embodiment of the detection device of the invention.

In FIGS. 2 to 4, only the elements of FIG. 1 have been shown which are included in the device of the invention, and whose arrangement is modified. It is a question of signals 11 and 30, of detector 6 and of circuit 7. In these figures, signal 11 has been shown after reflection thereof from the semi-reflecting mirror 13 of FIG. 1, assuming it then for example to be vertical. Similarly, signal 30 is shown after passing through the semi-reflecting mirror 32' of FIG. 1 and it is then assumed to be horizontal.

A first embodiment is shown in FIG. 2. A solid non linear medium 8 is pumped by two optical signals 31 and 32 having opposite directions, coming from the auxiliary optical signal or local signal 30. The first of these pumping signals, signal 31, is obtained downstream of a semi-reflecting mirror 331 disposed in the path of the local signal 30. This signal 31, having a horizontal direction on leaving mirror 331, is deflected through a suitable angle by a mirror 34 before penetrating into medium 8. The second pumping signal 32 is obtained by reflection of the first pumping signal 31, after it has passed through medium 8, from a mirror 9 disposed perpendicularly to its direction.

The solid medium 8 is for example a semi-conductor medium of the type used for forming laser diodes. The non linearity which it presents results in an index non linearity and in an amplification non linearity, one of these two non linearities being preponderant depending on the nature of the medium considered.

It will be recalled here that a medium has an index non linearity if, when this medium receives an optical signal, the index which it presents for this optical signal varies non linearly with the amplitude of the signal. We may say that this index is non linear with respect to the amplitude of the optical signal received.

Similarly, it will be recalled that a medium has an amplification non linearity if, when this medium receives an optical signal and re-emits another under the effect of the one it receives, the power amplification coefficient varies non linearly with the amplitude of the received signal. The power amplification coefficient is the ratio between the power of the re-emitted optical signal and that of the received optical signal. We may then say that this amplification coefficient is non linear with respect to the amplitude of the received optical signal.

The solid medium 8 also receives signal 11, which is vertical in direction, which gives rise to a re-emitted signal 12 having the same course as signal 11 but of opposite direction, which signal 12 is amplified and offset in frequency with respect to frequency 11. A semi-reflecting mirror 14 reflects signal 12 towards detector 6, whose reception axis is here horizontal.

The semi-reflecting mirror 331 reflects the signal 30 vertically towards a mirror 332 which reflects it in its turn horizontally towards a mirror 333. Mirror 333 reflects it vertically towards a semi-reflecting mirror 334, which mirror reflects it towards detector 6 while letting the amplified optical signal 12 pass.

As has already been mentioned, if $f_{o1}$ is the frequency of the local oscillator laser generating signal 30 and if f is the frequency of the signal to be detected 11, the frequency $f_a$ of the amplified signal 12 is equal to:

$$f_a = 2f_{o1} - f$$

and the beat between the frequency $f_a$ of signal 12 and the frequency $f_{o1}$ of signal 30 which takes place in detector 6 is at frequency $f_b$ which is equal to:

$f_b = f_{o1} - f$ that is to say at the same frequency as in the prior art system.

In the device of FIG. 2, the direction of the optical signal 11 to be amplified and the common direction of the pumping signals 31 and 32 form a non zero angle, which corresponds to the most general arrangement. However, the amplification may be made maximum by causing these two directions to form a zero angle, as in the device of FIG. 3.

In this device, the first pumping signal 31, downstream of the semi-reflecting mirror 331, penetrates into medium 8 without being deflected, i.e. here in the horizontal direction. After passing through medium 8, this first pumping signal 31 is reflected from a semi-reflecting mirror 9', here disposed vertically, and gives rise to the second pumping signal 32. The semi-reflecting mirror 9' lets signal 11 pass, deflected here horizontally towards the medium 8 by a semi-reflecting mirror 15. The amplified signal 12, following the same course as signal 11 to be amplified but in the opposite direction, is re-emitted therefore horizontally and passes through the semi-reflecting mirror 9', the semi-reflecting mirror 15 and the semi-reflecting mirror 334 to be applied to detector 6. The rest of the device is identical to that of FIG. 2.

In the device of FIG. 3, the purpose of the semi-reflecting mirrors 331 and 334 and of mirrors 332 and 333 is to direct the local signal 30 towards the detector 6.

As can be seen in the device of FIG. 4, the preceding elements may be omitted if the semi-reflecting mirrors 9' and 15 are adapted so that a sufficient part of the local signal 30 is applied to detector 6. In this case, the first pumping signal is the local signal 30 itself, a part of which passes through the semi-reflecting mirrors 9' and 15 towards detector 6, and the other part of which gives rise to the second pumping signal 32. Thus, the structure of the device is particularly simple and compact since it comprises successively, and over the path of the local signal 30, the solid medium 8, a semi-reflecting mirror 9' disposed perpendicularly to the path of the local signal 30, a semi-reflecting mirror 15 for directing signal 11 towards the solid medium 8 and a detector 6 connected to circuit 7.

Naturally, the scope of the present application is not limited to the description which has just been made. In particular, it is within the scope of a man skilled in the art to provide different arrangements from what has been described, particularly concerning the mirrors and the semi-reflecting mirrors.

Similarly, the example of application of the device of the invention to a telemetry system is not limitative, it is obvious that the device of the invention may be applied advantageously to all the situations in which a low power optical signal is to be detected by coherent optical detection, i.e. using an auxiliary source playing the role of local oscillator.

I claim:

1. A coherent optical detection arrangement for detecting a coherent optical target signal with increased sensitivity, comprising:
   (a) means for generating a coherent optical auxiliary signal;
   (b) a non-linear, solid medium, optical amplifier for amplifying the target signal to generate a coherent optical amplified signal;
   (c) pump means for generating a first coherent optical pumping signal and a second coherent optical pumping signal from the auxiliary signal, and for conducting the first pumping signal in a first direction to the amplifier, and for conducting the second pumping signal to the amplifier in a second direction opposite to the first direction;
   (d) beat means for beating the auxiliary signal and the amplified signal together to generate a beat signal indicative of the target signal; and
   (e) means for detecting the beat signal and, in turn, the target signal.

2. The arrangement according to claim 1, wherein the means for generating an auxiliary signal includes an auxiliary laser.

3. The arrangement according to claim 1, wherein the amplifier is a semiconductor laser diode.

4. The arrangement according to claim 1, wherein the amplifier has an amplifier characteristic which is non-linear as a function of the amplitude of the auxiliary signal.

5. The arrangement according to claim 1, wherein the pump means includes a light reflector, and conducts the first pumping signal through the amplifier to the reflector to reflect the second pumping signal therefrom.

6. The arrangement according to claim 5, wherein the pump means includes an optical element for allowing a first portion of the auxiliary signal to pass therethrough and serve as the first pumping signal, and for allowing a second portion of the auxiliary signal to be conducted to the beat means.

7. The arrangement according to claim 6; and further comprising means for directing the target signal to the amplifier along a third direction inclined relative to said first and second directions.

8. The arrangement according to claim 6; and further comprising means for directing the target signal to the amplifier along a third direction parallel to said first and second directions.

9. The arrangement according to claim 1, wherein the beat means is a quadratic detector having two inputs, one for the auxiliary signal, and the other for the amplified signal, and an output for the beat signal.

10. The arrangement according to claim 9, wherein the detecting means includes a filter for detecting the beat signal.

11. The arrangement according to claim 1, wherein the arrangement further comprises means for transmitting a coherent optical transmission signal at a target, and wherein the target signal is a reflection from the target; means for beating the transmission signal and the auxiliary signal to generate an emission signal; and means for detecting the emission signal.

* * * * *